United States Patent Office 3,316,250
Patented Apr. 25, 1967

3,316,250
9-AZABICYCLO(3,3,2)DECANES AND 9-AZABI-CYCLO(3,3,2)DECAN-10-ONES
Janis Plostnieks, Philadelphia, Pa., assignor to McNeil Laboratories, Incorporated, a corporation of Pennsylvania
No Drawing. Filed Sept. 2, 1964, Ser. No. 394,042
17 Claims. (Cl. 260—239.3)

This is a continuation-in-part of application Ser. No. 262,216 filed Mar. 1, 1963, now abandoned.

This invention relates to a new series of organic compounds and to methods for their preparation.

The novel compounds are defined by the general structural formula

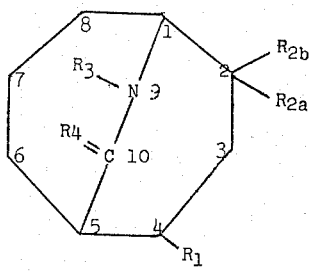

wherein $R_1$ stands for hydrogen or a monocyclic aryl group such as phenyl; $R_{2a}$ is hydrogen; $R_{2b}$ is the residue of a cyclic secondary amine joined to the ring carbon by a single bonded carbon-nitrogen linkage, e.g. pyrrolidinyl, morpholinyl, piperidinyl or pyrazinyl and when $R_{2a}$ and $R_{2b}$ are taken together they form the oxo group; $R_3$ is hydrogen, phenylacetyl, benzoyl; $(Alko)_n$-aroyl, where $n$ is a positive integer from 1 to 3, Alko stands for alkoxy from 1 to 7 carbon atoms, especially methoxy, and aroyl is benzoyl; AlkoCO, where Alko is lower alkoxy, e.g. ethoxycarbonyl, propoxycarbonyl, butoxycarbonyl, etc.; and diaralkylcarbonyl, for example diphenylacetyl; and $R_4$ stands for $H_2$ or oxo. Also included in the scope of this invention are the quaternary ammonium salts of the novel bases.

The novel compounds cause transient hypotension in dogs when administered intravenously beginning at 1 milligram per kilogram of body weight.

Starting with the appropriate bicyclo-(3,3,1)-nonan-9-one, the corresponding 9-azabicyclo-(3,3,2)-decan-10-one is obtained under Schmidt reaction conditions. If the starting material bears a cyclic amine group but is further ring unsubstituted, the resulting compound is obtained in two isomeric forms A and B. Either of these on reduction yields the corresponding 9-azabicyclo-(3,3,2)-decane which, when acylated, yields the corresponding 9-acyl-9-azabicyclo-(3,3,2)-decane.

Either of the two Isomers A and B, of the 9-azabicyclo-(3,3,2)-decan-2-one ring, substituted by a cyclic tertiary amino group may be converted to the corresponding 9-azabicyclo-(3,3,2)-decane-2,10-dione by oxidation-hydrolysis with mercuric acetate in a weak aqueous organic acid medium such as acetic acid, formic acid or propionic acid.

Schmidt Reaction conditions for converting the bicyclo-(3,3,1)-nonan-9-one to the 9-azabicyclo-(3,3,2)-decan-10-one call for a halogenated organic solvent such as carbon tetrachloride, chlorobenzene, trifluroacetic acid or, preferably, chloroform. The medium is made acidic with a strong inorganic acid such as hydrochloric, phosphoric or, preferably, sulfuric acid, following which, under low temperature conditions, sodium azide is added slowly over a period of time.

Reduction of the bridge carbonyl, i.e. conversion of the 9-azabicyclo-(3,3,2)-decan-10-one to the corresponding 9-azabicyclo-(3,3,2)-decan, is carried out with any one of a wide variety of well-known reducing agents such as, for example, a complex metal hydride, i.e. sodium borohydride, potassium borohydride, or preferably, lithium aluminum hydride, advantageously in the case of the borohydrides in the presence of a polar solvent such as methanol, ethanol, 2-propanol or water and, in the case of lithium aluminum hydride, an aprotic solvent such as anhydrous ether, ethylene glycol dimethylether or tetrahydrofuran.

Acylation of the 9-position of the 9-azabicyclo-(3,3,2)-decan is readily effected by reaction with the appropriate group intended for introduction into the bridge-nitrogen in the form of the anhydride or, preferably, the acid chloride. The reaction is conducted under basic conditions, obtained by addition of an alkali or alkaline earth metal hydroxide, carbonate or bicarbonate or sodium acetate, or a tertiary amine such as pyridine, in the presence of a suitable, inert organic solvent such as acetone, methylene chloride, ethylene chloride or chloroform.

Alternative methods suitable for preparing the compounds of this invention include Beckmann rearrangement of bicyclononanone oxime or aryl or sulfonyloxime in the presence of acid or base; cyclodehydration of aminocyclooctane carboxylic acids or their esters; or Baeyer-Villiger oxidation with peroxide or peracid or bicyclononanone, followed by conversion of the resulting lactone to the lactam.

The compounds of this invention may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, e.g. by reaction with alkali such as sodium or potassium hydroxide. The bases can be converted to their therapeutically useful acid addition salts by reaction with an appropriate organic or inorganic acid.

The novel compounds may be converted into the corresponding quaternary ammonium compounds by reaction of the tertiary bases with alkylating agents, i.e. alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, lower alkanols such as ethanol, propanol or butanol; or organic acid amides such as formamide or dimethylformamide. When lower alkyl halogenides are used as quaternizing agents, diethyl ether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono lower alkylsulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The following examples are intended to illustrate, but not to limit, the scope of the present invention.

EXAMPLE I

2 - (1 - pyrrolidinyl) - bicyclo(3,3,1)nonan-9-one (91.0 parts by weight) is dissolved in 450 parts by volume of chloroform. The solution is cooled to 0° C. and 165 parts by volume of concentrated sulfuric acid is added dropwise, keeping the reaction temperature below 20° C. The resulting suspension is cooled to 0° C. and sodium azide (57.2 parts by weight) is added in small portions over a period of thirty minutes. The reaction mixture is slowly heated to 50° C., at which point an exothermic reaction takes place. After the reaction subsides, the mixture is heated at 55° C. for forty-five minutes.

The reaction mixture is cooled in an ice bath and 248 parts by weight of sodium hydroxide in 500 parts by volume of water is added cautiously. The sodium sulfate thus formed is removed by filtration. The layers are separated and the water layer is extracted three times with chloroform. The chloroform solution is dried over magnesium sulfate and evaporated, leaving a dark brown oil. This oil is dissolved in a mixture of ether and water. The layers are separated and the ether layer, containing largely starting material, is extracted with water and discarded. The water layers are combined and extracted with methylene chloride. Evaporation of the methylene chloride solution yields a dark brown semisolid, which can be crystallized from n-hexane to give a brown oily solid. Evaporation of mother liquors gives a brown oil.

The brown solid is purified by passing it in methylene chloride solution through an alumina-charcoal column. Evaporation of the solvent gives a yellowish solid, melting point 135° C. to 142° C., 2-(1-pyrrolidinyl)-9-azabicyclo(3,3,2)decan - 10 - one. Recrystallization from dioxane raises melting point to 145.5° C. to 148° C. (Isomer A).

The mother liquor residue (see above) is purified by passing it in methylene chloride solution through an alumina-charcoal column, giving a light brown oil. This oil is allowed to react with 15 parts by weight of fumaric acid in isopropyl alcohol solution, yielding a fumarate, melting point 140° C. to 145° C. Recrystallization from isopropyl alcohol raises its melting point to 148° C. to 150° C. Hydrolysis of the fumarate gives a brown solid base. Recrystallization from ethyl acetate yields a white solid, melting point 113° C. to 117° C. (Isomer B).

EXAMPLE II

A solution of 8.0 parts by weight of 2-(1-pyrrolidinyl)-9-azabicyclo(3,3,2)decan-10-one (Isomer A) and 30 parts by volume of methyl iodide in 150 parts by volume of dry acetone is stirred at room temperature for three days. The resulting suspension is filtered, yielding a whilte solid. Recrystallization from absolute ethanol gives 1-(10 - oxo - 9 - azabicyclo(3,3,2)decan - 2 - yl)-1-methyl-pyrrolidinium iodide, melting point 241° C. to 243° C. (dec.) as a white solid.

EXAMPLE III

A solution of 20 parts by weight of 2-(1-pyrrolidinyl)-9-azabicyclo(3,3,2)decan-10-one (Isomer A) and 112.4 parts by weight of mercuric acetate in 400 parts by volume of 5% aqueous acetic acid is heated for one hour on the steam bath. The resulting suspension is cooled and filtered. The clear filtrate is saturated with hydrogen sulfide and the precipitate removed by filtration. Methylene chloride extraction of the filtrate yields a brown solid. Sublimation of the product yields a white solid, 9-azabicyclo(3,3,2)decane-2,10-dione, melting point 200° C. to 207° C. (softening at 190° C.).

EXAMPLE IV 2-(1 - pyrrolidinyl) - 9 - azabicyclo(3,3,2)decan-10-one (Isomer B) (1.0 part by weight) is dissolved in 30 parts by volume of tetrahydrofuran. Lithium aluminum hydride (0.5 part by weight) is added and the suspension is heated under reflux for eighteen hours. The reaction mixture is cooled and 5 parts by volume of water is added cautiously. The resulting suspension is filtered and the precipitate is washed thoroughly with ether. The combined organic solutions are dried over anhydrous potassium carbonate. Removal of the solvent yields 2-(1-pyrrolidinyl) - 9 - azabicyclo(3,3,2)-decane (Isomer B), boiling point 97°/0.3 mm.

EXAMPLE V 2-(1 - pyrrolidinyl)-9-azabicyclo(3,3,2)decane (Isomer B) (4.9 parts by weight) is dissolved in 50 parts by volume of methylene chloride, containing 2.0 parts by weight of anhydrous sodium acetate in suspension. Phenyl acetyl chloride (3.7 parts by weight) in 25 parts by volume of methylene chloride is added and the reaction mixture is stirred at room temperature for thirty minutes. Dilute sodium hydroxide solution is added and the layers are separated. The methylene chloride layer yields 7.5 parts by weight of a brown oil, from which 9 - phenylacetyl-2-(1-pyrrolidinyl) - 9 - azabicyclo(3,3,2) decane hydrochloride is obtained, melting point after recrystallization from methanol-ether, 230° C. to 232° C.

EXAMPLE VI

4 - phenyl-2-(1-pyrrolidinyl)bicyclo(3,3,1)nonan-9-one (19.5 parts by weight), melting point 79° C. to 84° C., is dissolved in 200 parts by volume of chloroform. The solution is cooled in an ice bath and 28 parts by volume of sulfuric acid is added over a period of one hour. Sodium azide (9.0 parts by weight) is added in two portions over five minutes. The mixture is heated slowly until reaction begins and then for an additional two hours at 55° C.

The reaction mixture is cooled in an ice bath and neutralized with 39 parts by weight of sodium hydroxide in 100 parts by volume of water. The layers are separated and the water layer is extracted three times with methylene chloride. Removal of solvent from the combined organic solutions gives a brown oil. Crystallization from n-hexane followed by recrystallization from dioxane yields a white solid, 4-phenyl-2-(1-pyrrolidinyl)-9-azabicyclo(3,3,2)decan-10-one, melting point 196° C. to 199° C.

EXAMPLE VII 2-(1 - pyrrolidinyl) - 9 - azabicyclo(3,3,2)decan-10-one (Isomer A) (17.5 parts by weight) is dissolved in 50 parts by volume of dry tetrahydrofuran and added to a suspension of 5.0 parts by weight of lithium aluminum hydride in 350 parts by volume of the same solvent over a period of fifteen minutes. The suspension is heated under reflux for eight hours and then kept at room temperature for sixteen hours.

The reaction mixture is cooled in an ice bath and 12 parts by volume of water is added over a period of twenty minutes. The suspension is stirred for one hour and filtered. The inorganic residue is washed thoroughly with ether. The combined filtrates are evaporated leaving a colorless oil, 2-(1-pyrrolidinyl)-9-azabicyclo(3,3,2)-decane (Isomer A), boiling point 102–103° C./0.4 mm. The product is characterized as its dihydrochloride, melting point 191° C. to 194° C.

EXAMPLE VIII 2-(1-pyrrolidinyl)-9-azabicyclo(3,3,2)decane (Isomer A) (8.0 parts by weight) is dissolved in 50 parts by volume of dry acetone. 10 parts by weight of anhydrous potassium carbonate is suspended in the solution and 9.3 parts by weight of 3,4,5-trimethoxybenzoyl chloride is added over a period of five minutes. The reaction mixture is left at room temperature for sixteen hours. The solvent is removed at the water pump and the residue is dissolved in dilute hydrochloric acid. The aqueous solution is washed with ether and made basic with sodium carbonate. The free base is extracted with methylene chloride; the solvent is removed and the residue crystallized from n-hexane. Recrystallization from ethyl acetate gives a white solid, 9-(3,4,5-trimethoxybenzoyl)-2-(1-pyrrolidinyl)-9-azabicyclo(3,3,2)decane, melting point 123.5° C. to 126.5° C.

EXAMPLE IX 2-(1-pyrrolidinyl)-9-azabicyclo(3,3,2)decane (Isomer A) (7.0 parts by weight) is dissolved in 50 parts by volume of dry acetone. Five parts by weight of anhydrous potassium carbonate is suspended in the solution and 5.1 parts by weight of ethyl chloroformate in 20 parts by volume of dry acetone is added to the stirred suspension over a period of ten minutes. The reaction mixture is left overnight at room temperature. The residue is removed by filtration. Evaporation of the solvent yields 9-carbethoxy-2-(1-pyrrolidinyl)-9-azabicyclo(3,3,2)decane as the hydrochloride. Recrystallization from butyl acetate gives a white solid, melting point 185.5° C. to 187.5° C. The product is characterized as its fumarate, melting point 193° C. to 195° C.

EXAMPLE X 2-(1-pyrrolidinyl)-9-azabicyclo(3,3,2)decane (Isomer A) (7.2 parts by weight) is dissolved in 100 parts by volume of dry acetone, containing in suspension 7 parts by weight of anhydrous potassium carbonate. Diphenylacetyl chloride, prepared from 15.0 parts by weight of diphenylacetic acid and 15 parts by volume of thionyl chloride, is slowly added to the suspension under stirring and external cooling. After standing at room temperature overnight the reaction mixture is evaporated. The residue is dissolved in dilute hydrochloric acid and washed with ether. The acidic solution is made basic with potassium carbonate and the product extracted with methylene chloride, followed by recrystallization from ethyl acetate, giving 9-diphenylacetyl-2-(1-pyrrolidinyl)-9-azabicyclo(3,3,2)decane, melting point 135° C. to 138° C.

EXAMPLE XI

Using the procedure of Example I and replacing 2-(1-pyrrolidinyl)-bicyclo (3,3,1)nonan-9-one with an equivalent amount of 2-(1-piperidinyl)-bicyclo(3,3,1)nonan-9-one, the resulting product is 2-(1-piperidinyl)-9-azabicyclo(3,3,2)decan-10-one.

EXAMPLE XII

Using the procedure of Example IV and replacing 2-(1-pyrrolidinyl)-9-azabicyclo(3,3,2)decan-10-one with an equivalent amount of 2-(1-periperidinyl)-9-azabicyclo (3,3,2)decan-10-one, the resulting product is 2-(1-piperidinyl)-9-azabicyclo(3,3,2)decane.

EXAMPLE XIII

Using the procedure of Example V and replacing 2-(1-pyrrolidinyl)-9-azabicyclo(3,3,2)decane with an equivalent amount of 2-(1-piperidinyl)-9-azabicyclo(3,3,2)dec- ane, the resulting product is 9-phenylacetyl-2-(1-piperidinyl)-9-azabicyclo(3,3,2)decane hydrochloride.

EXAMPLE XIV

Using the procedure of Example I and replacing 2-(1-pyrrolidinyl)-bicyclo(3,3,1)nonan-9-one with an equivalent amount of 2-(1-morpholinyl)-bicyclo(3,3,1)nonan-9-one, the resulting product is 2-(1-morpholinyl)-9-azabicyclo(3,3,2)decan-10-one.

EXAMPLE XV

Using the procedure of Example IV and replacing 2-(1-pyrrolidinyl)-9-azabicyclo(3,3,2)decan-10-one with an equivalent amount of 2-(1-morpholinyl)-9-azabicyclo(3,3,2)decan-10-one, the resulting product is 2-(1-morpholinyl)-9-azabicyclo(3,3,2)decane.

EXAMPLE XVI

Using the procedure of Example V and replacing 2-(1-pyrrolidinyl)-9-azabicyclo(3,3,2)decane with an equivalent amount of 2-(1-morpholinyl)-9-azabicyclo(3,3,2)decane, the resulting product is 9-phenylacetyl-2-(1-morpholinyl)-9-azabicyclo(3,3,2)decane hydrochloride.

EXAMPLE XVII

Using the procedure of Example II and replacing 2-(1-pyrrolidinyl)-9-azabicyclo(3,3,2)decan-10-one with an equivalent amount of 2-(1-piperidinyl)-9-azabicyclo(3,3,2)-decane, the resulting product is 1-(9-azabicyclo[3,3,2]decan-2-yl)-1-methyl-piperidinylium iodide.

What is claimed is:
1. A 9-azabicyclo(3,3,2)decane having the formula

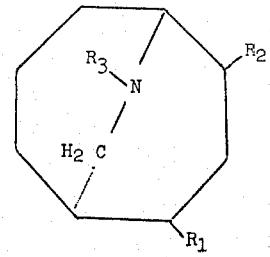

wherein $R_1$ stands for hydrogen and phenyl; $R_2$ is a member selected from the group consistinng of pyrrolidinyl, morpholinyl and piperidinyl; $R_3$ is a member selected from the group consisting of hydrogen, phenacetyl, benzoyl, (loweralko)n-benzoyl, wherein $n$ is a positive integer from 1 to 3, diphenylloweralkylcarbonyl and loweralkoxycarbonyl; and the nontoxic, therapeutically active acid addition salts and loweralkyl quaternary ammonium salts thereof.

2. A 9-azabicyclo(3,3,2)decan-10-one having the formula

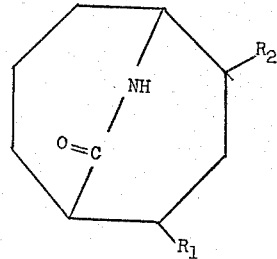

wherein $R_1$ stands for hydrogen and phenyl; $R_2$ is a member of the group consisting of pyrrolidinyl, morpholinyl and piperidinyl; and the nontoxic, therapeutically active acid addition salts and loweralkyl quaternary ammonium salts thereof.

3. 2-(1-pyrrolidinyl)-9-azabicyclo(3,3,2)-decan-10-one.

4. 1-[10-oxo-9-azabicyclo(3,3,2)decan-2-yl]-1-methylpyrrolidinium iodide.

5. 2-(1-piperidinyl)-9-azabicyclo(3,3,2)decan-10-one.
6. 2-(1-morpholinyl)-9-azabicyclo(3,3,2)decan-10-one.
7. 2-(1-pyrrolidinyl)-9-azabicyclo(3,3,2)-decane.
8. 2-(1-piperidinyl)-9-azabicyclo(3,3,2)decane.
9. 2-(1-morpholinyl)-9-azabicyclo(3,3,2)decane.
10. 1-(9-azabicyclo[3,3,2]decan-2-yl-1-methyl-pyrrolidinium iodide.
11. 9-phenylacetyl-2-(1-pyrrolidinyl)-9-azabicyclo(3,3,2)decane.
12. 9-phenylacetyl-2-(1-piperidinyl)-9-azabicyclo(3,3,2)decane hydrochloride.
13. 4-phenyl-2-(1-pyrrolidinyl)-9-azabicyclo(3,3,2)decan-10-one.
14. 9-(3,4,5-trimethoxybenzoyl)-2-(1-pyrrolidinyl)-9-azabicyclo(3,3,2)decane.
15. 9-carbethoxy-2-(1-pyrrolidinyl)-9-azabicyclo(3,3,2)decane.
16. 9-diphenylacetyl-2-(1-pyrrolidinyl)-9-azabicyclo(3,3,2)decane.
17. 1-(9-azabicyclo[3,3,2]decan-2-yl)-1-methyl piperidinylium iodide.

No references cited.

WALTER A. MODANCE, *Primary Examiner.*

ROBERT T. BOND, *Assistant Examiner.*